United States Patent
Kakhandiki et al.

(10) Patent No.: US 9,954,819 B2
(45) Date of Patent: Apr. 24, 2018

(54) SYSTEM AND METHOD FOR COMPLIANCE BASED AUTOMATION

(71) Applicant: Automation Anywhere, Inc., San Jose, CA (US)

(72) Inventors: Abhijit Kakhandiki, San Jose, CA (US); Sridhar Gunapu, Santa Clara, CA (US)

(73) Assignee: Automation Anywhere, Inc., San Jose, CA (US)

(*) Notice: Subject to any disclaimer, the term of this patent is extended or adjusted under 35 U.S.C. 154(b) by 189 days.

(21) Appl. No.: 14/988,877

(22) Filed: Jan. 6, 2016

(65) Prior Publication Data

US 2016/0119285 A1   Apr. 28, 2016

Related U.S. Application Data

(63) Continuation-in-part of application No. 14/834,773, filed on Aug. 25, 2015, and a continuation-in-part of
(Continued)

(51) Int. Cl.
| | |
|---|---|
| *G06F 15/16* | (2006.01) |
| *G06F 15/173* | (2006.01) |
| *A63F 13/00* | (2014.01) |
| *H04L 29/06* | (2006.01) |
| *G06F 9/445* | (2018.01) |

(Continued)

(52) U.S. Cl.
CPC ............. *H04L 63/02* (2013.01); *G06F 8/65* (2013.01); *G06F 21/57* (2013.01); *H04L 67/025* (2013.01); *H04L 67/34* (2013.01); *G06F 2221/033* (2013.01); *G06F 2221/034* (2013.01)

(58) Field of Classification Search
CPC ............. H04L 12/2809; H04L 12/2818; H04L 2012/2841; H04L 2012/2843; H04L 67/025; H04L 63/02; H04L 67/34; G06F 8/62; G06F 8/65; G06F 11/1433; G06F 17/30; G06F 17/30312; G06F 21/57; G06F 2221/033; G06F 2221/034
See application file for complete search history.

(56) References Cited

U.S. PATENT DOCUMENTS 6,473,794 B1 * 10/2002 Guheen ............... H04L 41/22
                                                709/223
6,704,873 B1 *  3/2004 Underwood ........ H04L 63/02
                                                709/223

(Continued)

OTHER PUBLICATIONS

Bergen et al., RPC automation: making legacy code relevant, May 2013, 6 pages.*

(Continued)

*Primary Examiner* — Thuy Dao
(74) *Attorney, Agent, or Firm* — Joseph R Carvalko; Cara C. Morris

(57) ABSTRACT

This invention generally relates to a process and computer code for enabling users to create adapters that enable application automation processes that allow customers to define compliance boundaries using a rules-based compliance firewall for their service providers and allow service providers to perform automation on customer machines remotely while adhering to customer's compliance requirements.

13 Claims, 4 Drawing Sheets

Related U.S. Application Data application No. 13/925,522, filed on Jun. 24, 2013, now Pat. No. 9,462,042, and a continuation-in-part of application No. 14/939,715, filed on Nov. 12, 2015.

(60) Provisional application No. 62/160,655, filed on May 13, 2015.

(51) Int. Cl.
  *H04L 29/08* (2006.01)
  *G06F 21/57* (2013.01)

(56) References Cited

U.S. PATENT DOCUMENTS

| | | | | |
|---|---|---|---|---|
| 8,028,269 B2* | 9/2011 | Bhatia | ............... | G06F 11/3604 |
| | | | | 717/101 |
| 8,504,803 B2 | 8/2013 | Shukla | | |
| 9,278,284 B2* | 3/2016 | Ruppert | ............... | G06F 8/60 |
| 9,444,844 B2* | 9/2016 | Edery | ............... | G06F 21/51 |
| 9,462,042 B2 | 10/2016 | Shukla et al. | | |
| 2004/0083472 A1* | 4/2004 | Rao | ............... | G06F 8/65 |
| | | | | 717/171 |
| 2004/0243994 A1* | 12/2004 | Nasu | ............... | G06F 8/65 |
| | | | | 717/171 |
| 2005/0257214 A1* | 11/2005 | Moshir | ............... | G06F 8/62 |
| | | | | 717/171 |
| 2007/0112574 A1* | 5/2007 | Greene | ............... | G06F 9/5072 |
| | | | | 340/572.1 |
| 2008/0028392 A1* | 1/2008 | Chen | ............... | G06F 8/61 |
| | | | | 717/175 |
| 2009/0313229 A1* | 12/2009 | Fellenstein | ............... | G06F 8/63 |
| 2010/0023602 A1* | 1/2010 | Martone | ............... | G06F 8/60 |
| | | | | 709/220 |
| 2010/0023933 A1* | 1/2010 | Bryant | ............... | G06Q 10/06 |
| | | | | 717/168 |
| 2010/0235433 A1* | 9/2010 | Ansari | ............... | G06Q 30/04 |
| | | | | 709/203 |
| 2011/0145807 A1* | 6/2011 | Molinie | ............... | G06F 8/65 |
| | | | | 717/170 |
| 2011/0302570 A1* | 12/2011 | Kurimilla | ............... | G06F 8/60 |
| | | | | 717/170 |
| 2016/0019049 A1 | 1/2016 | Kakhandiki et al. | | |
| 2016/0078368 A1 | 3/2016 | Kakhandiki et al. | | |

OTHER PUBLICATIONS

Zhifang et al., Test automation on mobile device, May 2010, 7 pages.*

Hu et al., Automating GUI testing for Android applications, May 2011, 7 pages.*

* cited by examiner

SYSTEM AND METHOD FOR COMPLIANCE BASED AUTOMATION

CROSS-REFERENCE TO RELATED APPLICATIONS

This is a continuation-in-part of and claims the priority benefit under U.S.C. 120 for U.S. patent application Ser. No. 14/939,715, filed Nov. 12, 2015, entitled Artificial Intelligence & Knowledge Based Automation Enhancement; and U.S.C. 120 for U.S. patent application Ser. No. 62/160,655, filed May 2013 Feb. 2015, entitled System And Method For Compliance Based Automation; and 35 U.S.C. 120 for U.S. patent application Ser. No. 14/834,773, filed Aug. 25, 2015, entitled System And Method For Upgrade Resilient Automation; and 35 U.S.C. 120 for U.S. patent application Ser. No. 13/925,522, filed Jun. 24, 2013, entitled System and Method For Enabling Application Discovery by Automation Needs; and the priority benefit under 35 U.S.C. 120 for U.S. Pat. No. 8,504,803, filed May 26, 2010, System and Method For Creating and Executing Portable Software, the entire disclosures of which are hereby incorporated by reference herein.

FIELD OF THE INVENTION

The present invention relates to information technology software that enables application automation processes that allow customers to define compliance boundaries for their service providers using a rules-based compliance firewall, and that allow service providers to perform automation on customer computers, remotely while adhering to customer's compliance requirements.

BACKGROUND OF THE INVENTION

End users of Web task, legacy applications, Apple (Apple is a registered trade mark of Apple, Inc.) or Windows (Windows is a registered trade mark of Microsoft Corporation) based operating systems create few automated processes, that is a series of steps that a user desires to execute on a computer (often at pre-defined times or with a click of a button or a mouse). These software processes could be of any type and for any purpose, e.g., business, IT, or requirements to validate software behavior, etc. In some instances, the user desires to create a task, assign properties to the task and to run the task on a local or a remote computer. Desirable applications may be the creation of adapters that enable application automation by collecting automation information; the locating of application controls and tracking changes between an older and newer version of an application; and presenting the changes using an exception management model to a user, so that the user can provide feedback in a visual, instead of programmatic manner; storing and incorporating the changes so as to make the adapters resilient to application changes and upgrades.

There are several situations when a software update needs to be performed on a remote machine. And, in some instances the remote machines do not permit a bidirectional communication with the service provider. Automation software can access the remote machine using remote access technologies such as remote desktop, Citrix, and web browser etc. For example, Remote Desktop Protocol (RDP) is a proprietary protocol developed by Microsoft, which provides a user with a graphical interface to connect to another computer over a network connection. The user employs RDP client software for this purpose, while the other computer must run RDP server software. In-house shared services, as well as third party business process outsourcing (BPO) entities (henceforth referred to as a "service provider"), may be located remotely in low-cost, high skill offshore locations and may need to access applications and data residing on their customer's computers.

However, customers need to protect proprietary trade secrets and intellectual property from unauthorized persons. Additionally there is a pressing need to protect the confidentiality of their customer data bases and such information as names, addresses, credit card numbers etc.

Hence there exists a need to impose strict access requirements to protect data privacy from among others, their service providers. Standards exist for information security management such as BS7799, ISO 17799 etc. that impose compliance requirements on service providers. However, current technology does not allow a customer to define compliance boundaries using a rules-based compliance firewall for their service providers. Further, current technology does not allow service providers to perform automation on customer machines remotely, while adhering to customer's compliance requirements. Thus, there is a need for an adjunct to remote access technologies that will allow a service provider to update a machine without having to establish a bidirectional communication link.

SUMMARY OF THE INVENTION

The disclosed invention includes a computer method for creating software on a first computer to be executed on one or more remote computers including the steps of:
A. (1) employing in the first computer remote access technology to access and update software on one or more remote computers; (2) determining a status of the one or more remote computers; (3) utilizing the status to create one or more automation profiles for execution in one or more remote computers; B. negotiating between the first computer and the one or more remote computers, a highest level protocol for the one or more remote computer compliance boundaries required to access an automation controller in the one or more remote computers; C. (1) creating in the first computer a set of execution files having one or more nested tasks for deployment; (2) appending a light weight play engine to the execution files; (3) delivering the executable files to the one or more remote computer automation controllers using a remote access technology; D. (1) executing in the one or more remote computers the light weight play engine having appended execution files; (2) reading the execution task files; and (3) updating the one or more remote computers.

In another embodiment of the invention is a computer method for creating a portable unit on a first computer to be executed on one or more remote computers including the steps of (a) performing automation updates on one or more remote computers, while adhering to one or more remote computers compliance requirements; and (b) enabling the one or more remote computers to define compliance boundaries using a rules-based compliance firewall; and (c) enabling the first computer, subject to the compliance boundaries, to create one or more adapters that enable automated applications to be executed on the one or more remote computers; and (d) incorporating the one or more adapters into the communication protocols of the first computer and the one or more remote computers such that the automation updates to take effect optionally at the initiation of the first computer or the one or more remote computers.

Another embodiment of the invention is a non-transitory computer-readable medium having stored thereon computer-readable instructions for enabling new and updated applications including the steps of: (a) enabling a service provider computer to perform automation on a remote customer computer, while adhering to remote customer computer compliance requirements by (b) enabling the remote computer (1) to define a compliance boundary that allows a service provider computer access to the remote customer; and (2) to execute an automated application, subject to the compliance boundaries, such that the remote computer receives new applications and updates other applications.

DESCRIPTION OF PREFERRED EMBODIMENT

Figure 1:
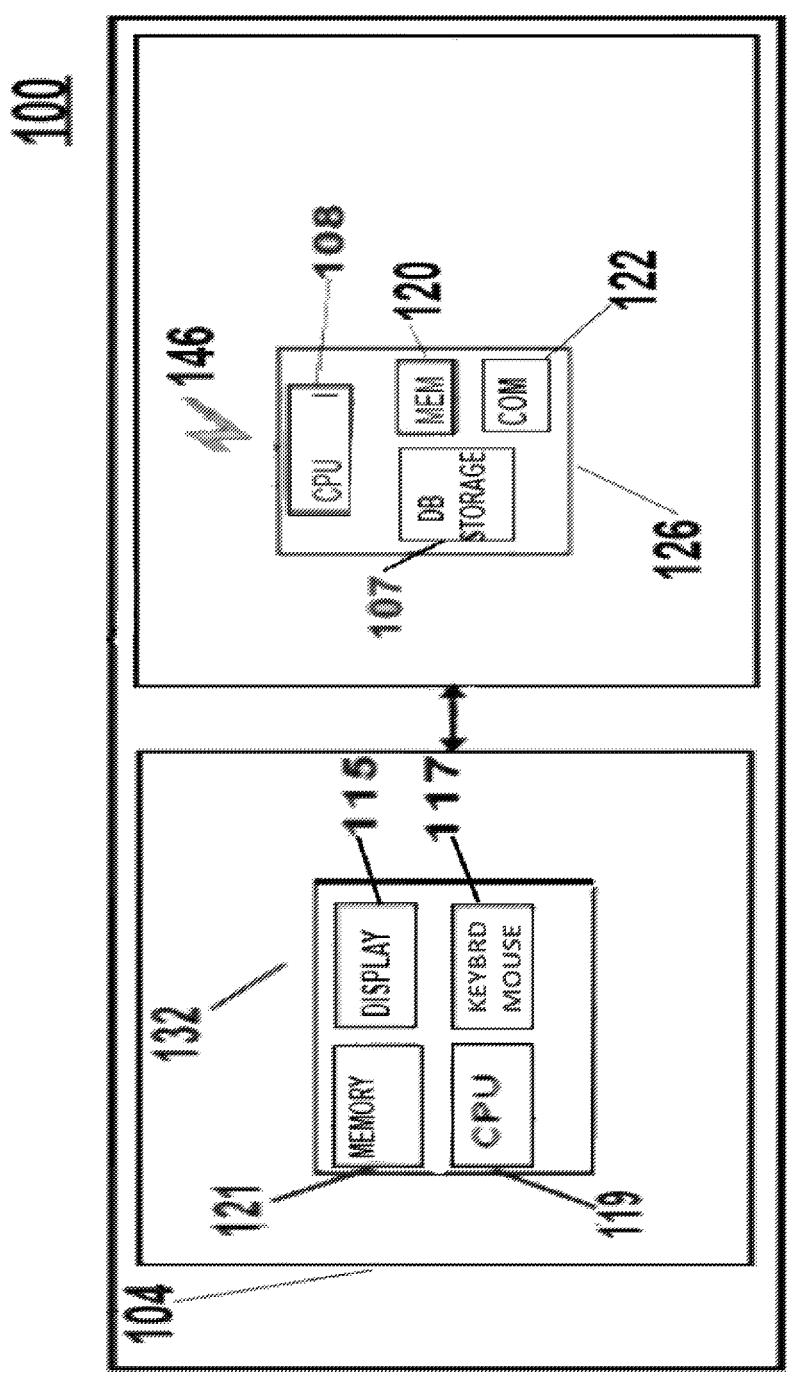
FIG. 1 shows a service provider computer system for creating one or more application execution files in accordance with an embodiment of the present invention.

The present invention will now be described more fully hereinafter with reference to the accompanying drawings, in which preferred embodiments of the invention are shown. This invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. In what follows, application software refers to all the computer software that causes a computer to perform useful tasks beyond the running of the computer itself. The disclosure relates to software, which manages and integrates a computer's capabilities, such as the generation of adapters to enable application automation by exposing operations that can be automated, in the form of an API that can be leveraged by various automation engines including Automation Anywhere (found at www.automationanywhere.com). One object of the invention is to assist in automatically upgrading older version applications to newer versions, which in turn serves the user or customer.

U.S. Pat. No. 8,504,803 entitled System and Method for Creating and Executing Portable Software, incorporated by reference herein, demonstrates the creation of commands having single execution features or as part of a several line operation or one of several commands that serves as an application for the inventive features of the process described herein. The present disclosure deals more specifically with an inventive process for executing applications in a service provider environment required to update applications in a remote computer, generally referred to as a computer-to-be-updated, or a customer computer or environment, while adhering to the customer's compliance boundary requirements.

The tasks in the service provider environment have one or more of a series of tasks having commands, and other instructions having variables, executable by the computer-to-be-updated's application. In one embodiment of the invention, the service provider computer assembles tasks into execution files, which may require validating the tasks and organizing nested tasks, including collecting nested task information for each task, and accounting for all dependencies to insure that files, tasks, and environments for running on one or more computer-to-be-updated computers are present. At least one or more dependencies will, subject to a computer-to-be-updated set of compliance boundary parameters, enable a service provider to create specific adapters that enable an automated application to be executed, when the adapters are incorporated into the computer-to-be-updated.

The creation of an execution file may include reading the task file, scanning for event dependencies and embedding files and links needed for the remote execution of the execution file, storing the dependencies in a dependency file, scanning for security, such as insuring the customer's compliance boundary parameters are present and functional, and verifying the task file for proper formatting. In the inventive process, the service provider must have access via a remote access technology, to deliver the elements of code, while respecting the compliance parameters, required for upgrading the computer-to-be-updated system.

FIG. 1 represents a service provider computer system 100, which includes computer 132 and server 126. Computer 132 has at least one central processing unit (CPU) 119, which typically is the processor for executing an operating system residing in memory 121. Computer 132 also operates a display 115 and an input device 117. The computer 132 has the facility to access other computers, such as server 126. The server 126 has at least one central processing unit (CPU) 108, which typically is the processor for an operating system and an application resident in memory 120, and communicates with and contains a database storage unit 107, as well as a means for communication 122 that can access the Internet 146.

The computer system 100 may further include a plurality of remote computers (not shown) and further by way of example and not limitation, to a plurality of mobile personal data assistants, tablets and smartphones (not shown) that may access the server 126 and operate the processes disclosed herein.

The system 100 may be configured in many different ways. For example, server 126 may be a conventional standalone server computer or alternatively, the function of server may be distributed across multiple computing systems and architectures. Server 126 may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to communications ports that serve as a communication link with other servers, client or user computers. A variety of communications protocols may be part of the system, including but not limited to: Ethernet, SAP, SAS™, ATP, Bluetooth, GSM and TCP/IP.

The data storage device 107 may store, for example, (i) program code for creating, executing and porting the software, as more fully described in connection with FIG. 2 and FIG. 3, to update the code in a customer's remote computer processor 152 in accordance with the present invention. More particularly data storage device 107 operates in accordance with a process for creating, executing and porting the software necessary to achieve updating a remote computer, such as embodied in computer system 150, and to achieve the novelty of the invention.

The program for creating, executing and exporting the portable software may be stored, for example, in a compressed, an uncompiled and/or an encrypted format, and may include computer program code. The program may include user generated macros that contain instructions to record and playback executable programs after having been deployed via a remote computer access program to the computer-to-be-updated.

While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

The term "computer-readable medium" as used herein refers to any medium that provides or participates in providing instructions to the computer 132 of the computing device (or any other processor of a device described herein) for execution and more particularly for creating, executing and porting the portable software. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

By way of example, various forms of computer readable media may be involved in carrying one or more sequences of one or more instructions to the computer 132 utilized in system 100, (or any other processor of a device described herein) for creating, executing and porting the portable software. For example, the instructions may initially be instantiated on a magnetic disk of a remote computer. The remote computer can load the instructions into its dynamic memory and send the instructions over an Ethernet connection, cable line, or even telephone line using a modem. A communications device local to a computing device (or, e.g., a server, such as communication module 122) can receive the data on the respective communications line and place the data on a system bus for the processor. The instructions received by main memory may optionally be stored in memory either before or after execution by the processor. In addition, instructions may be received via communication module 122 and associated port as electrical, electromagnetic or optical signals, which are exemplary forms of wireless communications or data streams that carry various types of information.

The service provider in fulfilling its provision of services, in accordance with the embodiment of the invention, seeks automatically, i.e., with little or no human intervention, to create an application to update a computer-to-be-updated such that it performs reliably.

Figure 2:
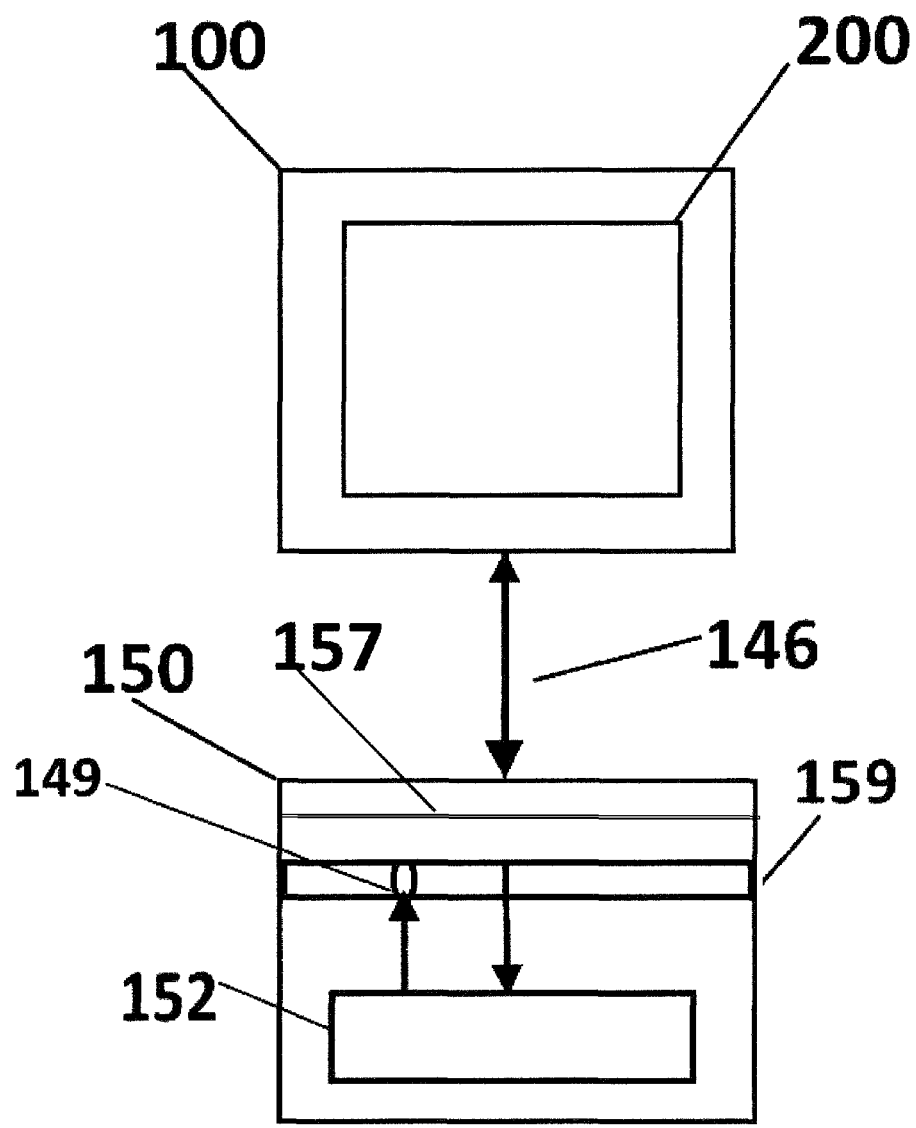
FIG. 2 shows a service provider computer system and a remote computer-to-be-updated system, in accordance with an embodiment of the present invention.
Figure 3:
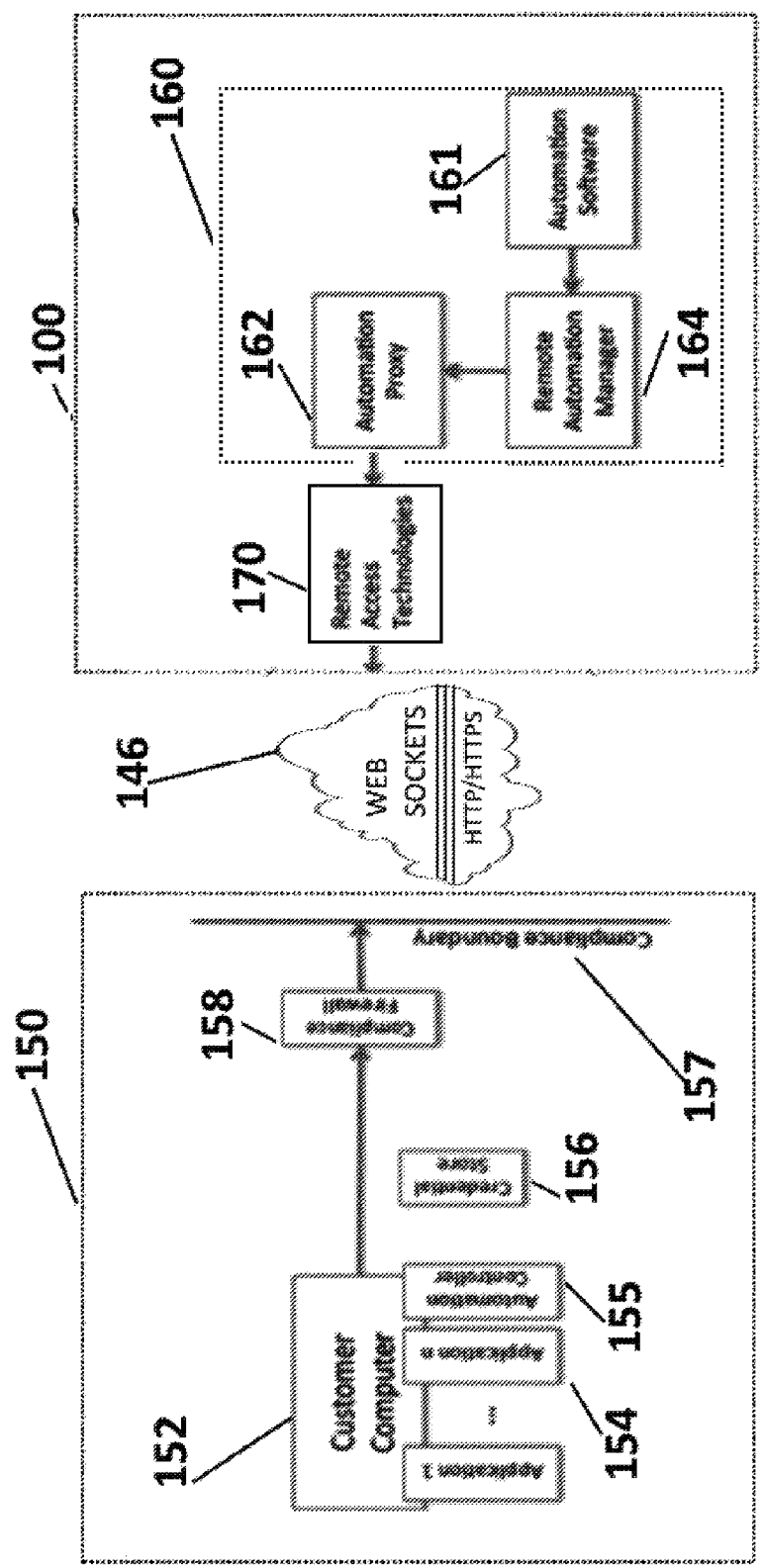
FIG. 3 shows a system that for a service provider computer to perform automation updates remotely on a customer computer, in accordance with an embodiment of the present invention.

Turning to FIG. 2 and FIG. 3, a remote access technology 170, represents any technology that allows a computer to remotely access another computer's screen, applications, data and configuration, and resides within the service provider's computer system 100. For example a remote desktop technology 170, such a Cytrix or a Microsoft Remote Desktop product, two of many technology products that are well known to those of ordinary skill in the art of systems maintenance, which will connect to a remote computer, such as the computer-to-be-updated, for example computer system 150, to establish a communication link between the computer system 150 and the computer system 100, to permit apps, files, and network resources to be made available from computer system 100 to computer system 150.

Turning to FIG. 3, a compliance automation technology resides in block 160. Automation software 161 and a remote automation manager 164 in conjunction with an automation proxy 162, utilize the remote desktop technology 170, to deploy a set of executable modules 200 (FIG. 2), also referred throughout as (a) execution files or (b) automation application(s), that when installed on computer system 150 are used (1) to determine the status of the computer system 150 as relates to processing power, current processing load, application footprint, application characteristics and application performance, as are available in one or more applications 154, (2) to locate one or more application controls (FIG. 3, 155); to track changes between an older and a newer version of an application 154; (4) to change in the remote computer system 150, among other things way of example: (a) adding of one or more new data fields, (b) removing of one or more data fields; (c) changing (i) a data field type, (ii) a field layout; (iii) an underlying technology framework of the application; and (5) to store the changes, and (5) to incorporate the changes so as to upgrade the computer-to-be-updated applications, and (6) to update generally the remote computer 150.

Automation proxy 162 negotiates the most high level protocol, including security protocols, for each remote customer computer 150, where automation is desired. An automation controller 155 resident on computer system processor 152, under the control of the automation proxy 162, configures the customer computer 150, so as to appear as a local machine relative to the automation software 161. To achieve this operation, automation software 161 sends all automation commands and queries to the remote automation controller 155, utilizing the automation proxy 162, while respecting the security compliance protocols of computer system 150. To achieve the objects of the invention the automation software 161 creates adapters that enable particular automated applications to be executed; and incorporates the adapters into the customer/service provider communication/security system to permit the remote application to take effect in the computer system 150 via the automation controller 155.

A compliance boundary 157 represents a logical boundary, across which, any transfer of data or other information is controlled by agreements between parties. As such, one important distinction between commercially available remote desktop technology, generally, and remote desktop technology 170, particularly is that the remote desktop technology 170 is disabled from performing certain tasks on computer system 150, by way of example and not limitation, copying files, loading cookies, or transmitting data from computer system 150, through or beyond a compliance boundary 157 onto the Internet connection 146 or any other output device that would violate the security protocols established by the computer system 150.

A compliance firewall 158 is located within the computer system 150 and represents software, which connects one or more remote automation controllers 155 and proxies to one another. The main function of the firewall 158 adds to the compliance boundary 157 security, utilizing a filter object function 159, for filtering out data and logical activities that are impermissible based upon a customer regime, established within computer system 150.

The firewall 158 is also capable of masking sensitive data and transforming data where needed. Requests from the automation software 161 to access computer system 150 are determined on the basis of credentials, i.e., the conditions of credential store 156, which must be satisfied before any action can be successfully performed on the customer system 150. The credential store 156 contains usernames, passwords and other secure data needed to be protected or hidden from service providers. It insures secure data storage and retrieval services to authorized software. It also manages logical naming to credential mapping, so that the credentials are known to service providers only via a logical name.

It is not desirable, nor efficient to have the credentials known to the service providers, such as the operators of computer system 100. The automation tasks to be performed refer to the credentials using a logical name and the firewall, which then interact with the credential store to auto fill the required secure fields by reverse mapping the name to the actual credentials.

Figure 4:
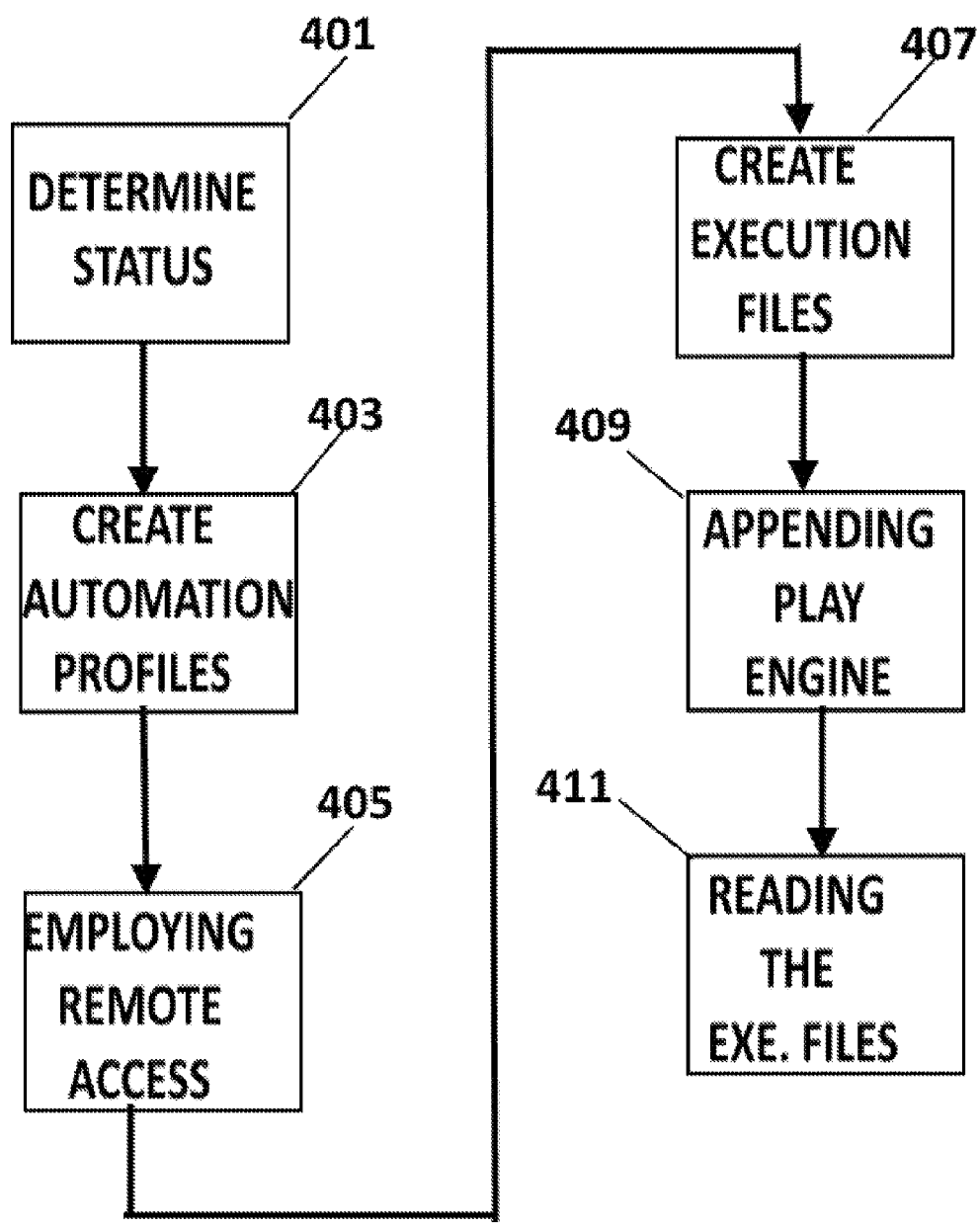
FIG. 4 shows a process that allows a service provider to perform automation updates on customer machines remotely, in accordance with an embodiment of the present invention.

FIG. 4 represents a non limiting embodiment of the invention for carrying out a process for creating an execution file for automating updating software on computer system 100, to be executed on one or more remote computers, such as a computer-to-be-updated such as computer system 150. During the initial communication exchange and after any subsequent exchange, computer system 100 is permitted only to determine the status of computer system 150. The status may include by way of example, processing power, current processing load, application footprint, application characteristics, application performance, and application software and system software revision dates. As such remote computer system 150 may query computer 100 for responses, requiring discrete replies, such as "Yes" or "No."

Turning to FIG. 4, in step 401, a process for updating a remote computer includes determining the status of the one or more remote computers, such as computer system 150, as the system relates to processing power, current processing load, application footprint, application characteristics and application performance. Step 403 includes creating, by computer system 100 automation profiles from the status, to be used in a set of modules executable in one or more remote computer systems (s) 150. Step 405 includes employing by the computer system 100, remote access technology 170 in order to utilize the services of an automation proxy 162, to access and automate one or more remote computers 150, having a compliance boundary 157 and associated compliance firewalls 158, based on supported protocols, by negotiating the highest level protocol for the one or more remote computers 150, in order to pass through the one or more remote computers compliance boundary 157 and fire wall 158, to access an automation controller 155. Step 407 includes creating by computer system 100 a set of execution files 200, having one or more nested tasks for deployment, said tasks having command line arguments executable as variables by the remote computer 150, assembled into a single execution file, and storing the variables in an array of memory, with respective values. Step 409 includes appending by the first computer system 100 a light weight play engine to the execution file 200, to deliver an automation executable set of modules, to the one or more remote computer 150 automation controllers 155, in order to configure the one or more remote computers 150, so it functions as a local machine relative to the automation proxy 162. Step 411 includes reading by the one or more remote computers 150 the execution task file 200 having the one or more of nested tasks, wherein the reading includes: initializing the execution file 200, by optionally making a local copy of the execution file; scanning the execution file 200 to determine if it meets the security compliance in place for the remote computer 150, wherein the scanning includes: checking the nested task for task calls to other tasks and backward compatibility; and ascertaining existence of the play engine; creating a new instance of the execution file 200, and updating the one or more remote computers 150.

While the foregoing invention has been described with reference to the above embodiments, additional modifications and changes can be made without departing from the spirit of the invention.

We claim:

1. A computer method for creating software on a first computer to be executed on one or more remote computers comprising the steps of:
   A. (1) employing in the first computer remote access technology to access and update software on one or more remote computers; (2) determining a status of the one or more remote computers; (3) utilizing the status to create one or more automation profiles for execution in one or more remote computers;
   B. negotiating between the first computer and the one or more remote computers, a highest level protocol for the one or more remote computer compliance boundaries required to access an automation controller in the one or more remote computers;
   C. (1) creating in the first computer a set of execution files having one or more nested tasks for deployment; (2) appending a light weight play engine to the execution files; (3) delivering the executable files to the one or more remote computer automation controllers using a remote access technology;
   D. (1) executing in the one or more remote computers the light weight play engine having appended execution files; (2) reading the execution task files; and (3) updating the one or more remote computers.

2. The computer method as in claim 1, wherein the status includes processing power, current processing load, application footprint, application characteristics and application performance.

3. The computer method as in claim 1, wherein the reading includes: initializing the execution file by optionally making a local copy of the execution file.

4. The computer method as in claim 1, further including scanning the execution file to determine if it meets the security compliance for the remote computer.

5. The computer method as in claim 1, wherein the execution files locate one or more application controls.

6. The computer method as in claim 1, wherein the execution files include track changes between an older and a newer version of an application.

7. The computer method as in claim 1, wherein the execution files includes a system or an application software update for the one or more remote computers, through one or more of: (a) an addition of one or more new data fields; (b) a removal of one or more data fields; (c) a change in data field type; (d) a field layout; (e) an underlying technology framework of the application.

8. The computer method as in claim 7, further including storing the update.

9. The computer method as in claim 7, further incorporating updates in the system or an application software.

10. The computer method as in claim 1, further including the step of scanning the execution file to check the nested task for task calls to other tasks.

11. The computer method as in claim 1, further including the first computer providing updates that are backward compatible in the one or more remote computers.

12. The computer method as in claim 1, wherein the tasks have command line arguments executable as variables by the one or more remote computers.

13. A computer method for creating a portable unit on a first computer to be executed on one or more remote computers comprising the steps of: (a) employing in the first computer remote access technology to access and update software on one or more remote computers;
 (b) performing automation updates on one or more remote computers, while adhering to one or more remote computers compliance requirements; and
 (c) enabling the one or more remote computers to define compliance boundaries using a rules-based compliance firewall; and
 (d) determining a status of the one or more remote computers; and
 (e) enabling the first computer, subject to the status of the compliance boundaries in one or more remote computers, to create in the first computer, (i) one or more adapters that enable automated applications to be executed on the one or more remote computers, and (ii) one or more automation profiles, for execution in one or more remote computers; and
 (f) (i) negotiating between the first computer and the one or more remote computers, a highest level protocol for the one or more remote computer compliance boundaries required to access an automation controller in the one or more remote computers, and (ii) incorporating the one or more adapters into the communication protocols of the first computer and the one or more remote computers such that the automation updates to take effect optionally at the initiation of the first computer or the one or more remote computers; and
 (g) (i) creating in the first computer a set of execution files having one or more nested tasks for deployment, (ii) appending a light weight play engine to the execution files, and (iii) delivering the executable files to the one or more remote computer automation controllers using a remote access technology; and
 (h) (i) executing in the one or more remote computers the light weight play engine having appended execution files, (ii) reading the execution task files, and (iii) updating the one or more remote computers.

* * * * *